Figure 1:
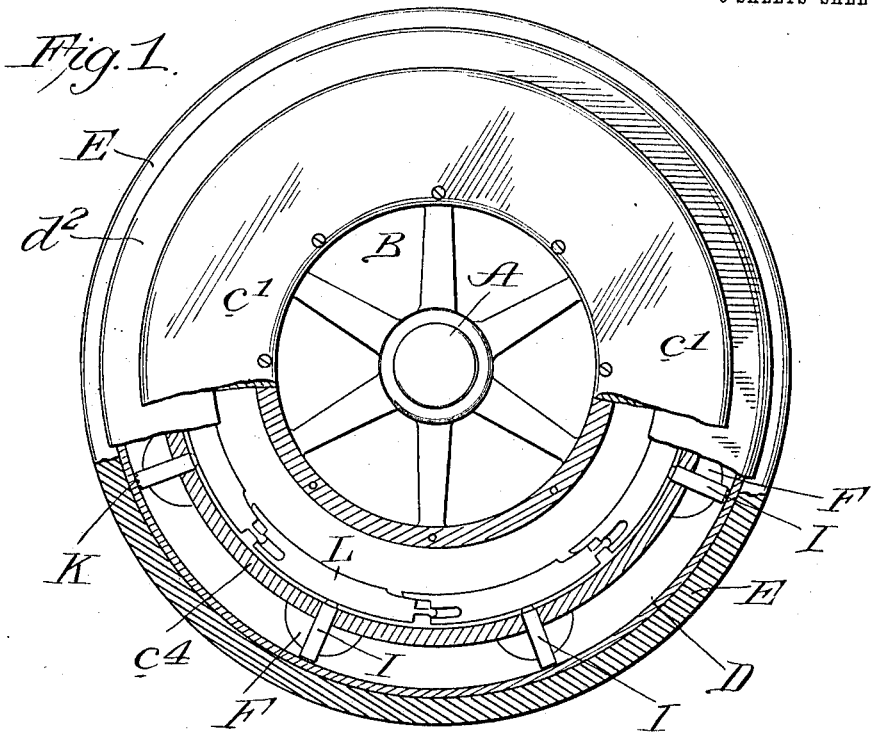

W. D. SIMPSON.
CUSHION TIRED WHEEL.
APPLICATION FILED MAY 4, 1912.

1,041,182.

Patented Oct. 15, 1912.

3 SHEETS—SHEET 1.

Witnesses:
M. E. Burrell
E. B. Franzoni.

Inventor:
W. D. Simpson
By his Attorneys:
Baldwin Wight

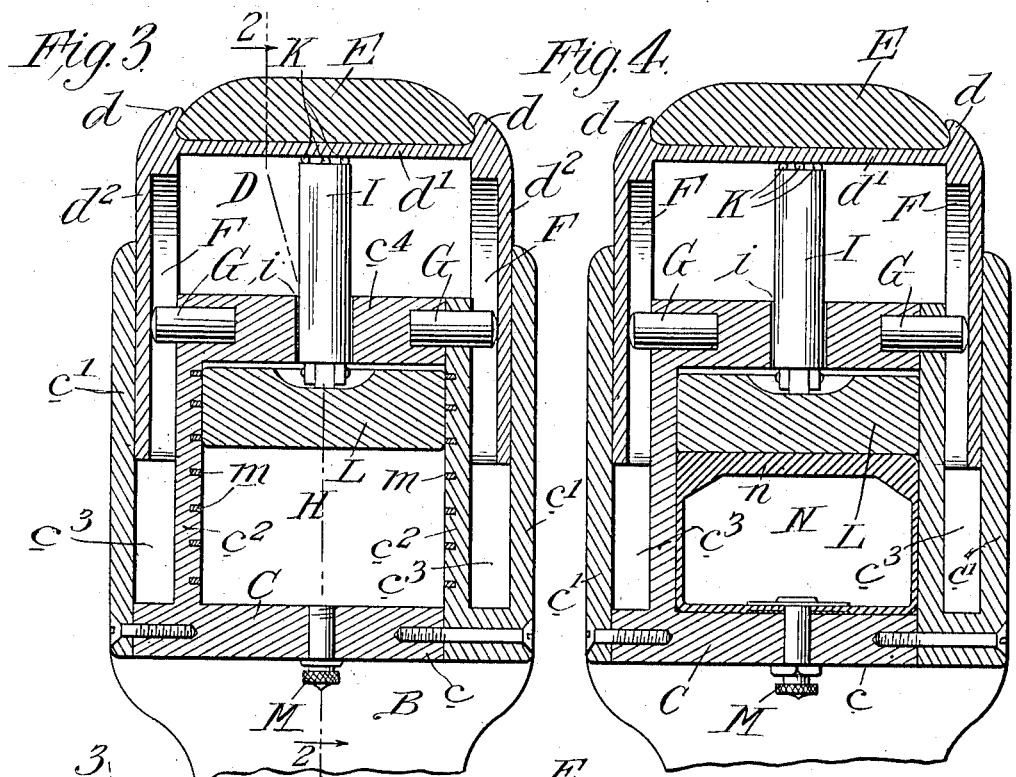
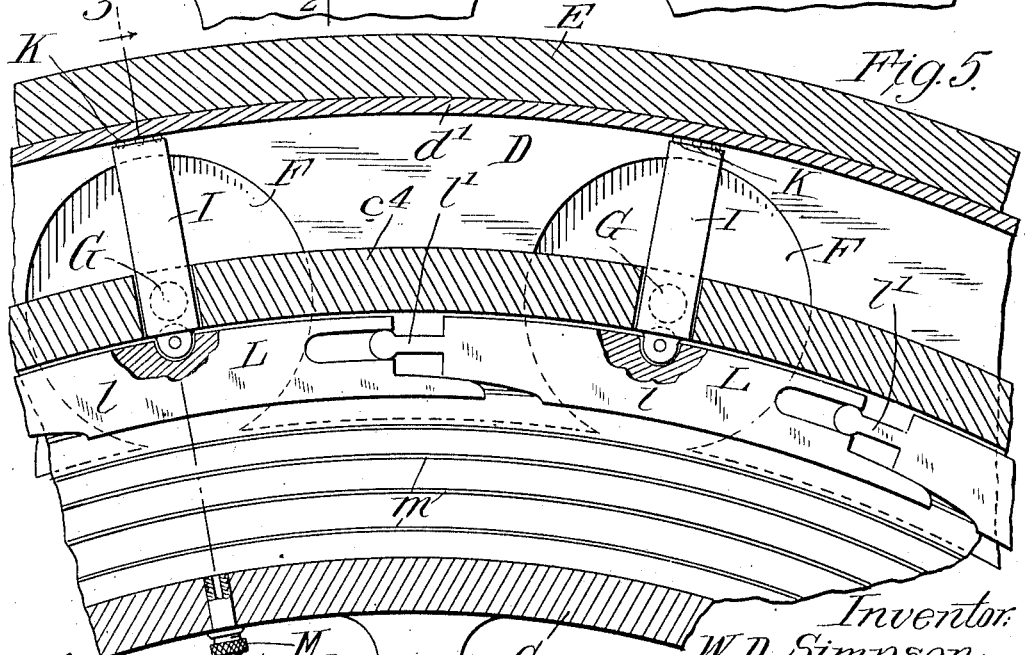

W. D. SIMPSON.
CUSHION TIRED WHEEL.
APPLICATION FILED MAY 4, 1912.
1,041,182.
Patented Oct. 15, 1912.
3 SHEETS—SHEET 3.
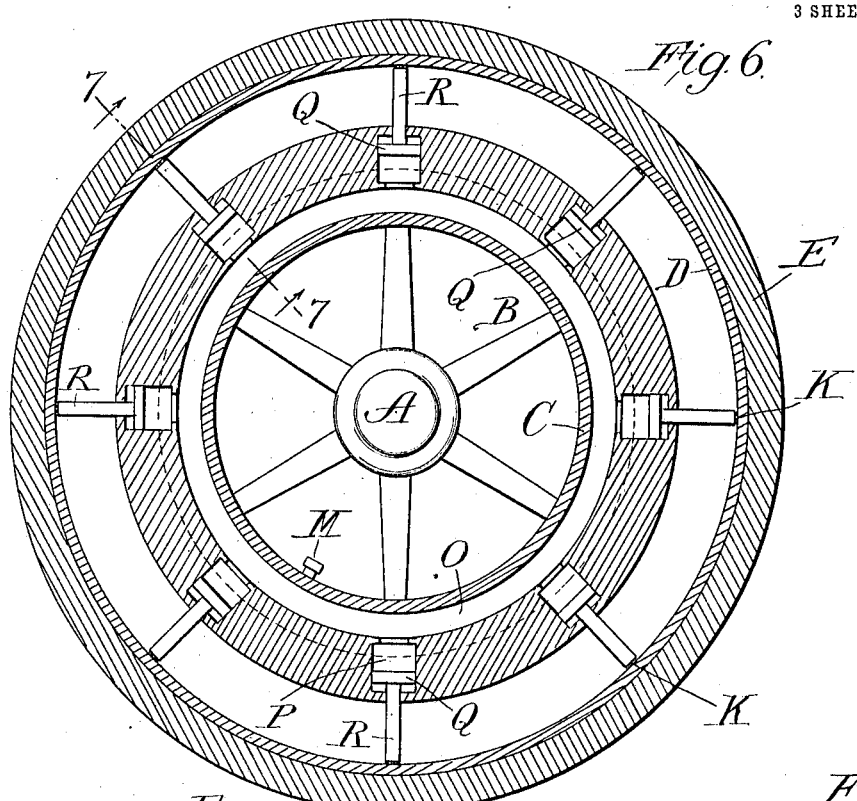
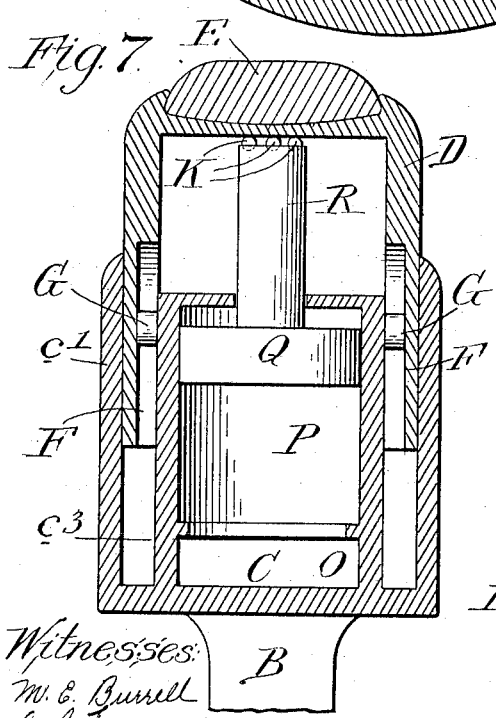
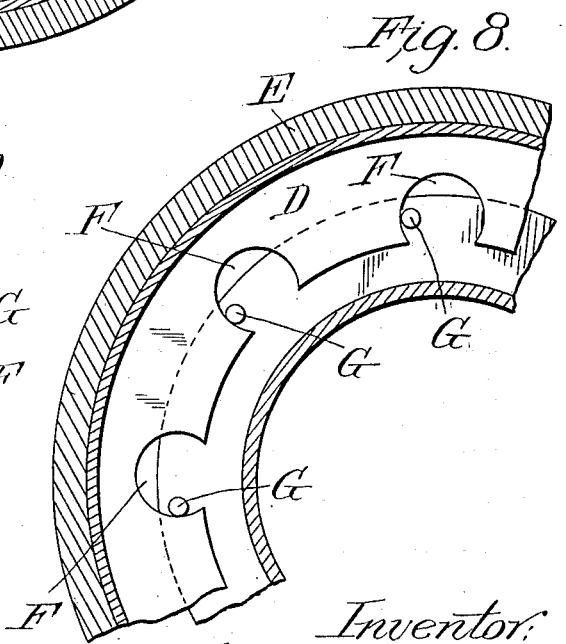
Witnesses:
M. E. Burrell
E. B. Franzoni
Inventor:
W. D. Simpson
By his Attorneys
Baldwin Wight

UNITED STATES PATENT OFFICE.

WILLIAM D. SIMPSON, OF COLUMBIA, SOUTH CAROLINA.

CUSHION-TIRED WHEEL.

1,041,182.  Specification of Letters Patent.  Patented Oct. 15, 1912.

Application filed May 4, 1912. Serial No. 695,061.

*To all whom it may concern:*

Be it known that I, WILLIAM D. SIMPSON, a citizen of the United States, residing in Columbia, in the county of Richland and State of South Carolina, have invented certain new and useful Improvements in Cushion-Tired Wheels, of which the following is a specification.

This invention relates to wheels of the class in which provision is made for absorbing shocks or vibrations and increasing the traction of the wheel by means of a tire which is constructed to yield radially as the wheel rotates and is subjected to varying strains. Wheels with pneumatic tires are now almost universally used for this purpose, but such tires when punctured or slightly ruptured are rendered inoperative, and furthermore are very expensive.

The object of my invention is to provide wheels of this class, with novel means for absorbing shocks or vibrations and increasing the traction, which are comparatively inexpensive, and which are not rendered inoperative by ordinary wear, puncture or rupture of the tread.

According to this invention I make the hub and spokes of the wheel of the usual construction and I provide an inner rim attached or connected in any suitable way with the spokes, and an outer rim which is movable radially with reference to the hub. The two rims have flanges which overlap each other and these prevent sidewise movement of the outer rim, and the inner rim is free to move to a limited extent circumferentially with reference to the outer rim, being confined in such movement by means of pegs or lugs carried by a part of the inner rim and projecting into recesses in the flanges of the outer rim.

The outer rim is held yieldingly in place a sufficient distance from the inner rim by radially arranged rods which connect with means operated pneumatically which tend to press the rods outward. The outer rim is made of metal and is therefore rigid, but it carries a tread of rubber, or other suitable material. The outer ends of the radial rods carry anti-friction devices, such as balls or rollers, which bear against the inner side of the metal outer rim and while the rods of the metal outer rim and while the rods press the tread-carrying rim outward, they permit it to turn or move circumferentially freely to a limited extent with reference to the inner rim. The inner rim is provided with an air chamber and the radial rods are so connected with this air chamber that the pneumatic pressure tends to press them outward to a uniform extent and thus hold the outer rim concentric with the axis of the wheel, but at times, as when an obstruction is encountered, some of the rods are forced radially inward thus compressing the air, causing the rods on the opposite side of the wheel to move radially outward within certain limits and thereafter the upper portion of the outer rim will separate from the outer ends of the rods.

In one form of my invention the rods connect with pistons operating in cylinders connected with the air chamber, while in another form of the invention the rods are pivotally connected with a continuous compression band or chain arranged in the air chamber and normally pressed outward by the pneumatic pressure but which is capable of bending or yielding at times. The joints between the links when a chain is employed are made air-tight, and between the sides of the band or chain and the sides of the air chamber, suitable packing is provided. I may place a pneumatic tube in the chamber of the inner rim and cause the band or chain to bear upon it.

Figure 2:
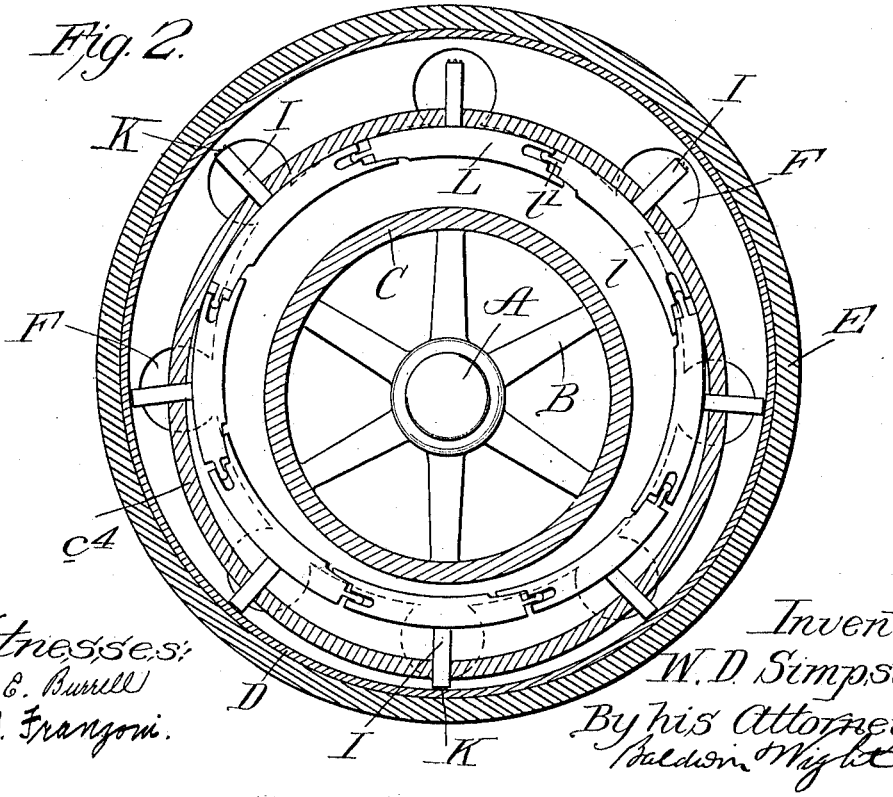

In the accompanying drawings, Figure 1 is a view partly in side elevation and partly in section of an automobile wheel embodying my improvements. Fig. 2 shows a vertical section thereof on a line corresponding with the line 2—2 of Fig. 3, looking in the direction of the arrows with some parts omitted the wheel being shown in the position it assumes when under load. Fig. 3 shows a transverse section on the line 3—3 of Fig. 5. Fig. 4 shows a section like Fig. 3, but illustrates a modification. Fig. 5 is a detail view on an enlarged scale and in vertical section on a line corresponding with the line 2—2 of Fig. 3. Fig. 6 shows a vertical section of a modified form of the invention. Fig. 7 shows a section on the line 7—7 of Fig. 6. Fig. 8 is a detail view showing how the pegs carried by the inner rim operate in the recesses formed in the flanges of the outer rim.

The hub A and spokes B may be of any suitable construction and the inner rim of the wheel may be applied to the spokes in any suitable way. The inner rim C, shown in Figs. 1 to 5 inclusive, comprises a base $c$, outer flanges $c'$, and inner flanges $c^2$, there being spaces $c^3$ between the inner and outer flanges to receive the flanges of the outer rim. The flanges may be removably secured to the body of the rim. Preferably, as shown, one of the flanges $c'$ is detachably connected with one side of the rim, while on the other side the flanges $c'$ and $c^2$ are made integral and are together secured to the body portion $c$.

The outer rim D is suitably flanged at $d$ and carries a tread E which may be made of rubber while the rim itself is made of metal and is rigid. The body portion $d'$ of the rim is provided on opposite sides with flanges $d^2$ which extend radially inward and enter the recesses $c^3$ of the inner rim. The flanged outer rim is free to move radially between the flanges $c^2$, $c^3$ of the inner rim, but in order to prevent the inner rim from spinning or moving circumferentially to an objectionable extent with reference to the outer rim, and to take the strain from the other parts, the flanges of the outer rim are formed with circular recesses F into which project pegs or lugs G extending from the inner rim. The arrangement is such that the free radial movement of the rims with reference to each other is permitted but the circumferential movement of one rim with reference to the other is limited. The pegs G will at times bear against the walls of the recesses F and follow the curvature of these walls when the wheel is in motion and when subjected to irregular strains or meets unusual obstructions, when a compound movement, i. e., a radial and circumferential movement is produced.

An air chamber H is provided on the inner rim between the closed body portion $c$ of the latter, its flanges $c^2$ and the outer wall $c^4$ which connects the flanges $c^2$, but which has radial openings $i$ at suitable intervals to receive the radial rods I which carry ball-bearings K on their outer ends pressing against the inner face of the outer rim. The rods I extend through the openings $i$ and enter the air chamber H. At their inner ends, as shown in Figs. 1 to 5 inclusive, they are pivotally connected with what I call a compression band or chain L which is continuous and is arranged within the air chamber. As shown most clearly in Fig. 5, this compression band or chain L is composed of links $l$ jointed at $l'$ to permit the bending or flexing of the band. These joints should be made in such manner that air cannot escape through them and in order to prevent air from escaping from the air chamber between the flanges $c^2$ and the opposite sides of the band suitable packing strips $m$ are provided.

M indicates a valve through which the chamber may be charged with compressed air. When so charged, the compression band L will be forced outward and held concentric with the axis of the wheel in the manner indicated in Fig. 1 and will press the radial rods I outward so as to hold the outer rim concentric with the hub, but when an obstruction is met with, the rods I will be pressed radially inward in the manner indicated in Fig. 2, and the compression band will be acted upon by such rods and will be moved within the air chamber in the manner indicated in Fig. 2, where, it will be observed, the lower portion of the compression band has compressed the air above and caused the upper portion of the band to move radially outward. This affords a yielding support for the outer rim which is very easy and reliable in operation. Inasmuch as the outer rim is rigid, when the compression band is moved in the manner just described the upper portion of the rim will temporarily leave the ends of the radial rods. If the motor is suddenly started or its speed increased there is a tendency for the inner rim to spin or move circumferentially with reference to the outer rim. If the connection between the two rims were such that no such movement were permitted, there would be considerable strain on the mechanism, but I avoid this strain by providing the recesses F and the pegs G which, while permitting a slight or limited circumferential movement of one rim with reference to the other, keeps such movement within proper bounds.

While it is possible to provide such joints between the links of the chain L and the sides of the chain and the walls of the air chamber that leakage will be prevented, yet I may, as shown in Fig. 4, place a pneumatic tube N in the air chamber and cause the chain or band L to rest on the periphery of this tube. The tube may be filled through a suitable valve M and the outer wall $n$ of the tube is preferably made considerably thicker than the other parts thereof.

Instead of employing a band or chain of the kind before described, I may employ the construction illustrated in Figs. 6 and 7. In this case the inner rim C and the outer rim D may be of substantially the same construction as that heretofore described. A circular air chamber O is formed in the inner rim and this communicates with cylinders P arranged radially on the inner rim and receiving pistons Q which operate radially in them and carry rods R having at their outer ends ball bearings K pressing against the inner side of the outer rim D. The air chamber may be filled through the valve M and the air pressure will tend to move the pistons radially outward and hold the outer rim concentric with the inner rim, but when one part of the wheel meets an obstruction or is subjected to unusual strain, the pistons of that part of the wheel will move radially inward yieldingly and will thus compress the air in the air chamber and cause it to move the pistons of other parts of the wheel radially outward. The wheel shown in Figs. 6 and 7 may be provided with means herein before described for permitting the inner rim to move circumferentially to a limited extent with reference to the outer rim.

Of course, any rupture, puncture or breakage of the tread will not in any way affect the pneumatic means for cushioning the tire, and provision is made for a yielding connection between the outer rim and the inner rim which not only permits these rims to move radially with reference to each other to a sufficient extent but also circumferentially to a limited extent without any strain on the radially moving parts of the cushioning mechanism.

I claim as my invention:

1. A cushion tired wheel, comprising a felly, an inner rim secured thereto having two flanges on each side with spaces between the flanges and provided also with an air chamber between the inner flanges, an outer rim having flanges extending into the spaces between the flanges of the inner rim and provided with circular recesses on their inner sides, pegs projecting from the inner rim and extending into the recesses to limit the circumferential movement of the rims relatively to each other, radial rods provided with ball bearings on their outer ends bearing against the outer rim and movable circumferentially to a limited extent relatively thereto, and means within the air chamber pressed outward by pneumatic pressure to which the rods are connected.

2. A cushion tired wheel, comprising a flanged inner rim provided with an air chamber between its flanges, an outer rim having a rigid metallic body portion and provided with flanges overlapping the flanges of the inner rim, radial rods bearing against the body portion of the outer rim, and a flexible band within the air chamber pivotally connected with said rods and pressed outward by pneumatic pressure.

3. A cushion tired wheel, comprising a flanged inner rim provided with an air chamber between its flanges, an outer rim having a rigid metallic body portion and provided with flanges overlapping the flanges of the inner rim, means for limiting the circumferential movement of the rims relatively to each other, radial rods bearing against the body portion of the outer rim, and a flexible band within the air chamber pivotally connected with said rods and pressed outward by pneumatic pressure.

4. A cushion tired wheel, comprising a flanged inner rim provided with an air chamber between its flanges, an outer rim having flanges overlapping the flanges of the inner rim, a pneumatic tube within the air chamber, a flexible band surrounding the pneumatic tube, radial rods bearing against the outer rim, and connections between said band and the inner ends of the radial rods.

In testimony whereof, I have hereunto subscribed my name.

WILLIAM D. SIMPSON.

Witnesses:
R. E. CARWILE,
BOBBIE TOON.